(12) United States Patent
Pron et al.

(10) Patent No.: US 7,390,439 B2
(45) Date of Patent: Jun. 24, 2008

(54) SULPHONIC ACIDS AS DOPANTS FOR POLYANILINE AND FOR CONDUCTIVE POLYANILINE-BASED COMPOSITE MATERIALS

(75) Inventors: Adam Pron, Saint Egreve (FR); Bruno Dufour, Checy (FR); Patrice Rannou, Eybens (FR); Jean-Pierre Travers, Saint Martin D'Heres (FR)

(73) Assignees: Commissariat a l'Energie Atomique, Paris (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 11/465,627

(22) Filed: Aug. 18, 2006

(65) Prior Publication Data

US 2006/0278854 A1  Dec. 14, 2006

Related U.S. Application Data

(63) Continuation of application No. 10/264,621, filed on Oct. 4, 2002, now Pat. No. 7,101,495.

(30) Foreign Application Priority Data

Oct. 10, 2001   (FR)   ................... 01 13045

(51) Int. Cl.
*H01B 1/12* (2006.01)
(52) U.S. Cl. ..................................... 252/500
(58) Field of Classification Search ............... 252/500
See application file for complete search history.

(56) References Cited

U.S. PATENT DOCUMENTS

| | | | |
|---|---|---|---|
| 5,520,852 A | 5/1996 | Ikkala et al. | |
| 5,670,607 A | 9/1997 | Chen | |
| 5,783,111 A | 7/1998 | Ikkala et al. | |
| 6,042,740 A | 3/2000 | Uehara et al. | |
| 6,235,220 B1 | 5/2001 | Pron et al. | |

FOREIGN PATENT DOCUMENTS

FR   2796397 A1   1/2001

(Continued)

OTHER PUBLICATIONS

Molecular Crystals and Liquid Crystals Science and Technology, Section A: Molecular Crystals and Liquid Crystals, "Electrochemical Synthesis and Characterization of Stretchable Polypyrrole Films", Eung Ju et al., (2001), vol. 371, pp. 243-246.

(Continued)

*Primary Examiner*—Mark Kopec
(74) *Attorney, Agent, or Firm*—Pearne & Gordon LLP

(57) ABSTRACT

The invention relates to the use of sulphonic, phosphonic and phosphoric acids functionalized with plasticizing groups as dopants for conductive polyaniline films and for conductive polyaniline-based composite materials. These acids correspond to the following formula (I):

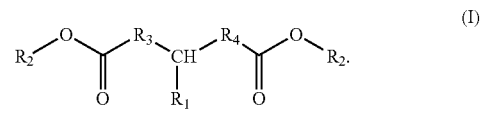

in which:
$R_1$ represents —$SO_2(OH)$ or —$PO(OH)_2$ or —$OPO(OH)_2$;
the $R_2$ groups, which are identical or different, represent a hydrocarbonaceous group, such as a 2-ethylhexyl, butoxyethyl or isopropylbenzyl group;
$R_3$ and $R_4$ independently represent a direct bond or a hydrocarbonaceous group, such as a methylene group.

31 Claims, 2 Drawing Sheets

FOREIGN PATENT DOCUMENTS

| | | | |
|---|---|---|---|
| JP | 08-100060 | * | 4/1996 |
| WO | WO 98/05040 A | | 2/1998 |
| WO | WO 01/04910 A | | 1/2001 |

OTHER PUBLICATIONS

Patent Abstracts of Japan, vol. 1998, No. 06, Apr. 30, 1998 & JP 10 036667 A (Nitto Denko Corp.), Feb. 10, 1998.

Synthetic Metals, vol. 48 (1992), pp. 91-97, "Counter-ion induced processibility of conducting polyaniline and of conductive polyblends of polyaniline in bulk polymers", Cao Yong et al.

J. Phys. Condens. Matter 10 (1998) 8293-8303, "A new acid-processing route to polyaniline films which exhibit metallic conductivity and electrical transport strongly dependent upon intrachain molecular dynamics", P.N. Adams et al.

Polymer, 1993, vol. 34, No. 20, pp. 4235-4240, "Processable conducting polymers obtained via protonation of polyaniline with phosphoric acid esters", Adam Pron et al.

Synthetic Metals 80 (1996), pp. 191-193, "Thermally processable polyaniline protonated with diphenyl phosphate—preparation and structural aspects", A. Pron et al.

* cited by examiner

SULPHONIC ACIDS AS DOPANTS FOR POLYANILINE AND FOR CONDUCTIVE POLYANILINE-BASED COMPOSITE MATERIALS

This application is a continuation of application Ser. No. 10/264,621, filed Oct. 4, 2002, now U.S. Pat. No. 7,101,495.

TECHNICAL FIELD

A subject-matter of this invention is compositions comprising conductive polymers and more particularly polyaniline-based compositions. These compositions are intended to participate in the manufacture of conductive polyaniline-based films which exhibit in particular good mechanical properties and which can be used in the form of thin films deposited on a support or in the form of self-supported thin films. These films can be composed solely of a single polymer, namely polyaniline, or of several polymers, constituting, at that point, conductive composite materials comprising conventional polymers, in particular elastomers, which thus confer elasticity on the conductive materials. Such materials find their application in particular in the field of optoelectronics, where they are used in the formation of transparent electrodes.

STATE OF THE PRIOR ART

Polyanilines, commonly referred to as PANI, have formed the subject of much research. In addition to their obvious conductive properties, their synthesis, from the inexpensive aniline monomer, is simple and gives excellent yields. Furthermore, the conductive form of the polyaniline denotes excellent chemical stability with respect to the air.

However, to become conductive, the polyaniline, generally obtained in its non-conductive base form, must undergo a stage of protonation by a doping product which can take place either before the preparation of the conductive film or after the preparation of the said film.

However, the doping, after the formation of the polyaniline film, is a difficult stage, in so far as the polyaniline is an infusible compound which shows very little solubility in the majority of organic solvents.

Furthermore, once protonated, the conductive form of the polyaniline is virtually insoluble in nonpolar or weakly polar solvents and, for this reason, cannot aspire to participate in the formation of conductive composite materials.

The document (1): Synthetic Metals, 48, 1992, pp. 91-97, provides for the use of functionalized protonic acids which make possible both the doping of the polyaniline and the dissolution of the complex thus obtained in organic solvents. Such protonation agents are, for example, dodecylbenzenesulphonic acid or camphorsulphonic acid, known as CSA. However, the conductive films obtained by this method exhibit a moderate conductivity and mediocre mechanical properties intrinsic to the polyaniline film.

The document (2): J. Phys.: Condens. Matter, 10, 1998, pp. 8293-8303, describes the preparation of conductive polyaniline in the presence of 2-acrylamido-2-methyl-1-propanesulphonic acid, known as AMPSA, in an acidic solvent, such as 2,2-dichloroacetic acid. However, although the temperature at which the transition between nonmetallic behaviour and metallic behaviour occurs is lower than for the PANI-CSA system seen above, the electrical conduction is lower than that measured for the same system.

The documents (3): Polymer, 1993, Volume 34, Number 20, pp. 4235-4240, and (4): Synthetic Metals 80, 1996, pp. 191-193, present processes for the preparation of conductive polyanilines employing protonation agents of the diesters of phosphoric acid type. The protonation agents experimented upon are, in particular, bis(2-methylpropyl) hydrogen phosphate, bis(2-ethyl-hexyl) hydrogen phosphate, bis(n-octyl) hydrogen phosphate and diphenyl hydrogen phosphate. Although the mechanical properties, including in particular the plasticity, are improved with respect to the preceding preparations, the electrical conductivities remain relatively moderate and range from 10 to 65 S/cm.

The document (5): FR 2 796 379, presents a method for the preparation of polyaniline exhibiting improved mechanical properties. The authors use dopants of the diesters of 4-sulphophthalic acid type, in particular the 2-ethylhexyl diester of 4-sulphophthalic acid, known as DEHEPSA. The polyaniline doped in this way exhibits a reasonable electrical conductivity but a moderate elongation at break of the order of 35%, as will be seen subsequently.

Thus, there exists a true need, with regard to conductive polyanilines, to obtain a compound which is both a good electrical conductor and which also exhibits satisfactory mechanical properties, both from the viewpoint of plasticity and from the viewpoint of flexibility.

Finally, there exists a need to obtain electrically conductive composite materials which incorporate such conductive polyanilines and which have mechanical properties intrinsic to the composite material which are not damaged by the presence of the conductive polymer.

DESCRIPTION OF THE INVENTION

The aim of the present invention is the use of a novel family of dopants which provide both for the protonation of polyaniline while improving its mechanical properties. Thus, these novel agents exhibit, in their structure, a two-fold functionality, namely at least one acid group capable of protonating the polyaniline, in order to render it conductive, and groups capable of improving the mechanical properties of the conductive polymer.

To do this, a subject-matter of the invention is a composition for the manufacture of conductive polyaniline films or of conductive polyaniline-based composite material comprising:

a polyaniline present in its emeraldine base form, and a dopant corresponding to the general formula:

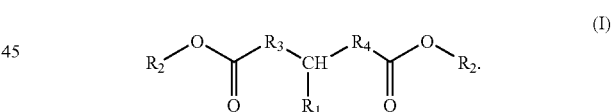

(I)

in which:

$R_1$ represents —$SO_2$(OH) or —PO(OH)$_2$ or —OPO(OH)$_2$, the $R_2$ groups, which are identical or different, represent a saturated or unsaturated hydrocarbonaceous group with a linear or branched chain, which can comprise, in its chain, one or more aromatic groups and/or one or more oxygen atoms, or represent a cyclic or aromatic hydrocarbonaceous group, and $R_3$ and $R_4$ independently represent a direct bond or a saturated or unsaturated hydrocarbonaceous group with a linear or branched chain, which can comprise, in its chain, one or more aromatic groups and/or one or more oxygen atoms, or represent a cyclic or aromatic hydrocarbonaceous group.

It is specified that, in the present application, the term "polyaniline" also refers to the forms of the polyaniline which are substituted on the aromatic rings or on the nitrogen atoms.

It is also specified that, in the present application, in that which precedes and that which follows, the term "conductive" is understood to mean electrically conductive.

With regard to the formula (I), the $R_1$ group can be an $—SO_2(OH)$ or $—PO(OH)_2$ or $—OPO(OH)_2$ group. The dopant thus is a member of the family of the sulphonic, phosphonic or phosphoric acids respectively. This group provides for the protonation of the emeraldine base form of the polyaniline, in order to render it conductive.

In this formula, the $R_2$ groups, which are identical or different, can be a linear or branched hydro-carbonaceous group which can comprise unsaturated units and which generally has from 1 to 24 carbon atoms, preferably from 5 to 12 carbon atoms. This group can comprise, in its chain, one or more aromatic groups and one or more oxygen atoms, for example 1 to 6 oxygen atoms, preferably two oxygen atoms.

By way of example, $R_2$ can be a linear or branched alkyl group comprising 1 to 24 carbon atoms, preferably comprising 5 to 12 carbon atoms, such as the 2-ethylhexyl group; the $R_2$ group can be a linear or branched alkyl group comprising, in its chain, from 1 to 3 oxygen atoms, such as the butoxyethyl group or the butoxyethoxyethyl group.

According to the invention, $R_2$ can also represent a cyclic or aromatic hydrocarbonaceous group, for example the isopropylbenzyl, benzyl or phenyl group.

This group fulfils, according to the invention, a two-fold function:
- it contributes to reinforcing the plasticity of the host material of the dopant by the presence of the hydrocarbonaceous group with a long or medium chain, which exhibits a hydrophobic nature, and
- it facilitates the solubility of the polyaniline, with which it is mixed, in a large number of organic solvents.

The $R_3$ and $R_4$ groups can represent bridge-forming hydrocarbonaceous groups or a direct bond (or simple bond). $R_3$ and $R_4$ form a bridge between the protonating acid functional group and the ester functional groups with a plasticizing hydrocarbonaceous chain. In particular, $R_3$ and $R_4$ can represent an alkylene group comprising 1 to 24 carbon atoms. Preferably, $R_3$ represents a direct bond and $R_4$ a methylene group.

According to an embodiment of the invention, the dopant corresponding to the formula (I) can comprise an $R_2$ group in the form of a linear or branched alkyl group comprising from 5 to 12 carbon atoms.

According to another embodiment of the invention, the dopant corresponding to the formula (I) can comprise an $R_2$ group in the form of a linear or branched alkyl group comprising, in its chain, from 1 to 3 oxygen atoms.

According to one or other of these embodiments of the invention, the $R_3$ group can be a direct bond and the $R_4$ group can be a methylene group.

In the alternative where $R_3$ represents a direct bond and $R_4$ a methylene group, the sulphonic, phosphonic or phosphoric acids constitute derivatives of diester of succinic acid type, in which the succinic acid is functionalized in the α position by an $—SO_2(OH)$, $—PO(OH)_2$ or $—OPO(OH)_2$ group.

According to the invention, these dopants can correspond to the following formulae:

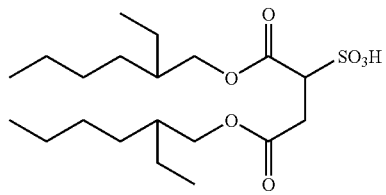

The formula (II) corresponds to the di(2-ethylhexyl) ester of sulphosuccinic acid, referred to as DEHESSA.

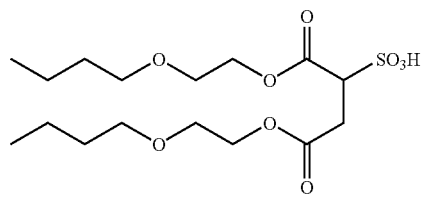

The formula (III) corresponds to the di(butoxyethyl) ester of sulphosuccinic acid, referred to as DBEESSA.

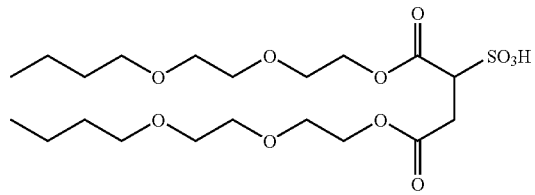

The formula (IV) corresponds to the di(butoxyethoxyethyl)ester of sulphosuccinic acid, referred to as DBEEESSA.

With regard to their method of preparation, these sulphonic, phosphonic or phosphoric acids can be prepared, for example, by esterification starting from functionalized succinic acids and from alcohols of formula $R_2OH$, $R_2$ having the definition given above.

The succinic acids functionalized in the a position may be either commercially available or be synthesized by sulphonation, phosphorylation or phosphatation.

As regards the other possible alternatives relating to the compounds included in the formula (I), the preparation can be envisaged by passing the salt of the acid of formula (I), possibly available commercially, over an ion-exchange column or by esterification of the corresponding sulpho-, phosphono- or phosphorocarboxylic acid with the corresponding alcohol $R_2OH$. In the ease of the phosphono- and/or phosphorocarboxylic derivatives, it may be necessary to use protective groups for the phosphonic functional groups and phosphoric functional groups, the choice of these groups being within the scope of a person skilled in the art.

To summarize, the compounds of the formula (I) are used as dopants for polyaniline in the emeraldine base form. These dopants fulfil a two-fold function. First, the sulphonic, phosphonic or phosphoric acid groups provide for the protonation of the basic sites, in this instance imine sites, of the polyaniline chain, thus rendering it conductive. Secondly, the functional groups of the ester type contribute to plasticizing the polymer, thus rendering it more flexible and more resistant to various mechanical stresses. Thus, from this composition, conductive products are obtained which exhibit conductivities of greater than 100 S/cm and elongations at break generally of greater than 100%. Furthermore, when the ester functional groups have substituents of the alkyl type, this also contributes to bringing about, surprisingly, a significant degree of structural organization of the doped polymer.

The polyaniline employed in the context of this invention exists in the emeraldine base form. This is because the protonated form of emeraldine proves to be more conductive than the two other oxidation states known for polyaniline, namely leucoemeraldine and pernigraniline.

The emeraldine base can be prepared by chemical oxidative polymerization or by enzymatic oxidative polymerization or by other processes, such as electropolymerization.

The emeraldine base form of polyaniline corresponds to the following formula (V):

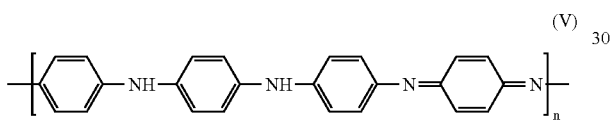

(V)

In this formula (V), the subscript n corresponds to the number of repeat units in the polymer chain. This subscript can, according to the invention, be greater than 10 and preferably greater than 500. It should be noted that, for polyaniline, the repeat unit is composed of a sequence of 4 aniline monomers.

In the compositions according to the invention, the molar ratio of the dopant to the polyaniline preferably ranges from 0.4 to 0.6. This ratio is calculated by assuming that the molar mass of the polyaniline, reduced to a monomer unit composed of an aromatic ring and a nitrogen atom, is 90.5 g/mol.

A modification to the composition, described below, can consist in adding, to the composition already comprising the polyaniline in the emeraldine base form and the dopant, a plasticizer known as an "external plasticizer", thus named in contrast to the dopant, which fulfils the role of internal plasticizer. The external plasticizer does not have acid properties and is therefore, for this reason, incapable of protonating the polyaniline base. The content of this plasticizer with respect to the polyaniline is preferably from 10 to 40% by weight. The presence of this plasticizer contributes to improving still more the mechanical properties of the product which will result from the composition.

Among the plasticizers which can be used in the context of the invention, the plasticizer can be chosen from diesters of phthalic acid, such as, for example, di(2-ethylhexyl) phthalate (VI), referred to as DOP, or esters of phosphoric acid, such as triphenyl phosphate (VII), referred to as TPP, and tritolyl phosphate (VIII), referred to as TTP. This list is, of course, not exhaustive and can be extended to any family of compounds which can fulfil the role of plasticizer.

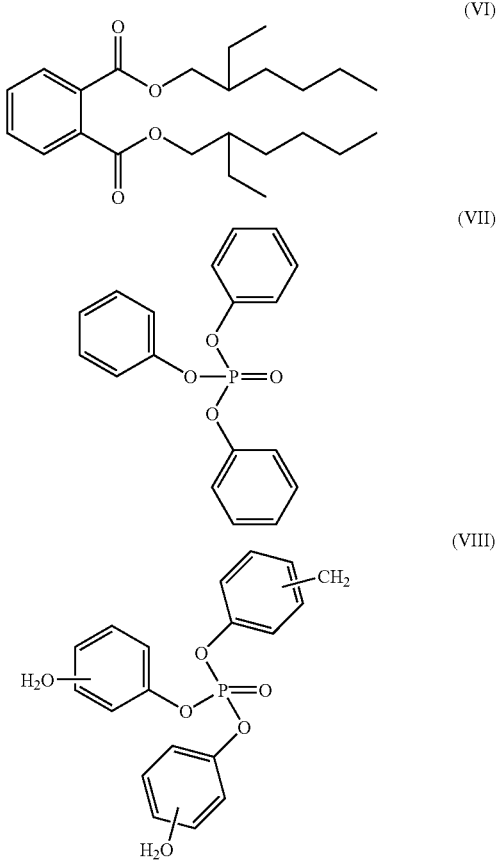

According to the invention, the composition described above can additionally comprise a solvent.

It is specified that, according to the invention, the term "solvent" refers both to a single solvent and to a mixture of solvents.

Use is preferably made, as solvents, of halogenated derivatives of carboxylic acids corresponding to the general formula (IX):

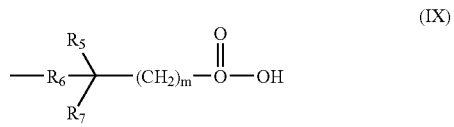

(IX)

in which the $R_5$, $R_6$ and $R_7$ groups each represent the same atom or, at least, two different atoms chosen from the group of atoms consisting of H, F, Cl, Br and CN; the subscript m is equal to 0 or is an integer of less than 12, preferably of less than 4. The $pK_a$ of this solvent preferably should not exceed 5 and preferably the solvent should have a $pK_a$ exceeding by at least 0.5 that of the sulphonic, phosphonic or phosphoric acids of formula (I).

By way of examples, the solvents corresponding to the formula (IX) which can be used according to the invention are chosen from 2,2-dichloroacetic acid, 2,2-difluoroacetic acid, perfluoroacetic acid, chloro-difluoroacetic acid, bromoacetic acid, chloroacetic acid or a mixture of these. Preferably, the solvent used is 2,2-dichloroacetic acid.

Other examples of solvents, not coming within the scope of the formula (IX), can also be used in the context of this invention, such as, for example, 2-chloropropionic acid, 2,2-dichloropropionic acid, 2,2-bis(trifluoromethyl)-2-hydroxyacetic acid, cyanoacetic acid, pyruvic acid, 2-oxobutyric acid, 2-chlorobutyric acid, 2-oxo-3-methylbutanoic acid, formic acid, acrylic acid or acetic acid, or a mixture of these.

According to the invention, the polyaniline content is from 0.1 to 10% by weight.

Another subject-matter of the invention is a process for the manufacture of a conductive polyaniline film.

Two alternatives are possible, according to the invention, for preparing, from the abovementioned compositions, a conductive polyaniline film exhibiting advantageous properties.

According to a first alternative, the starting point is a composition, devoid of solvent, comprising the polyaniline in the emeraldine base form, a dopant as defined above and optionally a plasticizer in accordance with the invention, and, from the said composition, the film is formed by heat treatment. On conclusion of this heat treatment, a conductive polyaniline film is obtained. The thermal processes for forming the conductive polyaniline film according to the invention are conventional processes well known to a person skilled in the art, such as injection moulding, extrusion, hot pressing, calendering or thermoforming.

According to a second alternative, the starting point is a composition comprising the polyaniline in emeraldine base form, a dopant as defined above and optionally a plasticizer according to the invention, and a solvent. This solution is poured over a support, for example of glass, of alumina or of polyethylene, and then the film is formed by evaporation of the solvent. On conclusion of this process, a conductive film deposited on the support is obtained. The film obtained can be easily detached from the support to give a self-supported conductive polyaniline film.

Another subject-matter of the invention is a polyaniline doped by a compound as defined above. The dopants used are chosen, for example, from acids, such as DEHESSA of formula (II), DBEESSA of formula (III) or DBEEESSA of formula (IV). The conductive polyaniline can additionally comprise a plasticizer. This plasticizer is, for example, triphenyl phosphate.

Another subject-matter of the invention is a process for the manufacture of a conductive composite material comprising a conductive polyaniline and an insulating polymer.

According to the invention, it is specified that the term "insulating polymer" refers both to a single insulating polymer and to blends of insulating polymers.

As in the case of the manufacture of conductive polyaniline films, two alternatives according to the invention can be envisaged.

According to a first alternative, the process consists, in a first step, in mixing a composition according to the invention, comprising a polyaniline in emeraldine base form, a dopant and optionally a plasticizer, with an insulating polymer. In a second step, the conductive composite material is formed from the mixture obtained, by heat treatment of the mixture obtained above. This treatment can be followed, for example, by an extrusion phase. This alternative of the process exhibits the advantage of not requiring the use of solvent, which avoids the trapping of a portion of the latter in the polymer matrix obtained.

According to a second alternative of the process, in a first step, a first solution, formed from a composition according to the invention comprising a polyaniline, a dopant, a solvent as defined above and optionally a plasticizer, is mixed with a second solution of an insulating polymer in a solvent. In a second step, the conductive composite material is formed by evaporation of the solvents from the mixture obtained. Preferably, the solvent of the first solution and the solvent of the second solution are identical.

The insulating polymer according to the invention can be chosen, for example, from vinyl polymers, such as poly(vinyl chloride), cellulose polymers, such as cellulose acetate, acrylic polymers, such as poly(methyl methacrylate), polymers of the polyesters type, such as poly(ethylene terephthalate), polymers of the polyamides type, such as polyamide-6, 6, and blends of these.

The fact of adding a conductive polyaniline polymer, optionally comprising a plasticizer, to a matrix composed of insulating polymer does not in any way harm the mechanical properties of the insulating polymer, in so far as the dopant added to the polyaniline contributes, in addition to the electrical conductivity, to improving, at the same time, the mechanical properties of the latter.

Another subject-matter of the invention is a conductive composite material comprising an insulating polymer matrix within which is dispersed a conductive polyaniline doped by a dopant as defined above. The dopant can be chosen, for example, from DEHESSA of formula (II), DBEESSA of formula (III) or DBEEESSA of formula (IV). This material can additionally comprise a plasticizer. This plasticizer is, for example, triphenyl phosphate. The insulating polymer which participates in the formation of the conductive composite material is, for example, poly(methyl methacrylate). Generally, the polyaniline content of the composite material is from 0.01 to 40% by weight.

Other characteristics and advantages of the invention will emerge more clearly on reading the examples below, given by way of illustration and without implied limitation, with reference to the appended drawings.

DETAILED DESCRIPTION OF SPECIFIC EMBODIMENTS

Figure 1:
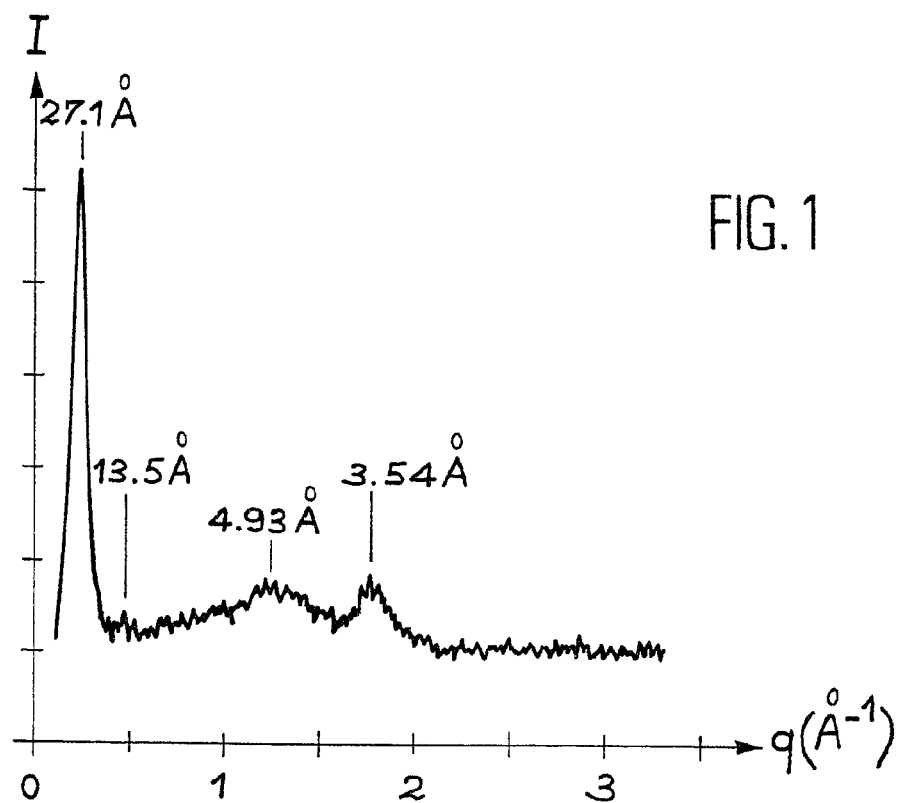
FIG. 1 represents the diffractogram of polyaniline doped by a dopant according to the invention, this dopant being DEHESSA of formula (II).

The following examples illustrate in particular the use of dopants in accordance with the invention, such as DEHESSA of formula (II), DBEESSA of formula (III) or DBEEESSA of formula (IV), which are used in the formation of conductive polyaniline films and of conductive composite materials. Comparative tests are carried out with dopants of the prior art, such as the di(2-ethylhexyl)ester of 4-sulphophthalic acid, known as DEHEPSA, camphorsulphonic acid, known as CSA, or 2-acrylamido-2-methyl-1-propanesulphonic acid, known as AMPSA.

EXAMPLE 1

In this example, the preparation is carried out of a conductive film of polyaniline doped with DBEEESSA of formula (IV), which contributes to rendering the polyaniline in the emeraldine base form conductive and to simultaneously improving its mechanical properties, namely its plasticity and its flexibility.

a) Manufacture of the Emeraldine Base

In a first step, a solution of freshly distilled aniline is prepared in a water/ethanol/LiCl mixture. The exact composition of the mixture is as follows: 10 ml (0.1097 mol) of aniline, 85 ml of a 3M aqueous hydrochloric acid solution, 95 ml of ethanol and 16 g of LiCl. This solution is mixed with a solution comprising the oxidizing polymerization agent, consisting of 6.25 g (0.0274 mol) of ammonium persulphate, 60 ml of 2M HCl and 8 g of LiCl. Before mixing, the two solutions are precooled to −27° C. The reaction is allowed to take place for approximately 2 hours while controlling the potential of the reaction mixture with respect to a standard calomel electrode. A reducing solution, composed of 3.64 g (0.0183 mol) of $FeCl_2$, 5 g of LiCl and 50 ml of 2M HCl, is subsequently added in order to exert better control over the exact oxidation state of the polyaniline formed. After an additional hour, the reaction is terminated and the polymer obtained is extracted from the reaction medium, either by filtration or by centrifuging. The polymer powder is subsequently washed with large amounts of distilled water, until the silver nitrate test, to determine the presence of chloride ions, is negative. The combined product is then dried until a constant mass is obtained. The salt of emeraldine, obtained in the hydrochloride form, is then converted to emeraldine base by treatment with 2 litres of a 0.3M aqueous ammonia solution for 48 hours. The deprotonated polyaniline is subsequently washed with 5 litres of distilled water, followed by 2 litres of methanol, and then dried until a constant mass is obtained.

The fractions with a low molecular weight are removed by washing the polymer with chloroform in a Soxhlet apparatus. The intrinsic viscosity of the emeraldine base as prepared is 2.5 dl/g, in a 0.1% by weight solution in 96% sulphuric acid.

b) Preparation of DBEEESSA of Formula (IV)

DBEEESSA is prepared from sulphosuccinic acid and 2-(2-butoxyethoxy)ethanol during an esterification reaction. The protocol is as follows: 10 g of sulphosuccinic acid, in the form of a 70% by weight aqueous solution (50.5 mmol), are mixed with 24.6 g of 2-(2-butoxyethoxy)ethanol (151.5 mmol). The reaction is carried out at 110° C. under a constant stream of purified nitrogen. The product obtained is dried until a constant mass under vacuum ($10^{-5}$ mbar) at 70° C. is obtained. The product is identified and characterized by $^1H$ NMR, IR and elemental analysis.

c) Preparation of a Self-Supported and Drawable Film of Polyaniline Doped with DBEEESSA 111 mg of polyaniline base and 302 mg of DBEEESSA (molar ratio dopant/PANI=0.5) are mixed in 22.2 g of 2,2-dichloroacetic acid. The solution is stirred for a period which can range from a few days to a few weeks, until no further change is observed in the UV-vis-NIR spectrum. Self-supported films can be prepared from this solution by pouring. Approximately 1 ml of this solution is deposited on a polypropylene substrate. The solvent is removed by evaporation at 45° C. under an argon atmosphere. The film thus obtained is detached from its substrate and dried under vacuum ($10^{-5}$ mbar) until a constant mass is obtained. The films obtained have a thickness of the order of 20-30 micrometres.

Its conductivity, measured by a 4-contact method, is of the order of 90 S/cm at ambient temperature. The film, drawn manually at ambient temperature, exhibits an elongation at break of 195%.

COMPARATIVE EXAMPLE 1

In this comparative example, the same procedure is followed as in Example 1, using the same dopant/polyaniline molar ratio and the same concentration of polyaniline in 2,2-dichloracetic acid but this time using the 2-ethylhexyl diester of 4-sulphophthalic acid, known as DEHEPSA, described in the reference (5), as dopant. The conductive film obtained exhibits a conductivity of 115 S/cm and an elongation at break of 36%, i.e. not very satisfactory mechanical properties.

COMPARATIVE EXAMPLE 2

The same experimental conditions are used as in Example 1 but the solvent used is m-cresol and the dopant is camphorsulphonic acid, known as CSA, as is described in the reference (1). The electrical conductivity at ambient temperature is 230 S/cm and the elongation at break is 2%, i.e. very mediocre mechanical properties.

EXAMPLE 2

In this example, the drawability of films of doped polyaniline in accordance with the invention is compared with that of films of polyaniline doped by 2-acrylamido-2-methyl-1-propanesulphonic acid, referred to as AMPSA, used in the publication (2). In all cases, use is made of the procedure of Example 1, a dopant/PANI molar ratio of 0.5 and a 0.5% by weight solution of PANI in 2,2-dichloroacetic acid.

The molar ratio is calculated on the basis of the molar mass of the emeraldine base corresponding to one monomer unit of the emeraldine, which is 90.5 g/mol.

Drawing tests are carried out under the same experimental conditions, namely at ambient temperature and at a draw rate of 1 mm/min.

The dopants chosen, coming within the scope of the general formula (I), are DBEESSA of formula (III) or DBEEESSA of formula (IV).

The elongation at break results are 130% for PANI/DBEESSA, 195% for PANI/DBEEESSA and 115% for PANI/AMPSA.

These combined examples clearly show that the use of dopants in accordance with the invention corresponding to the general formula (I) significantly improves the elongation at break of the films of doped polyaniline while maintaining their conductive properties.

EXAMPLE 3

Using the same experimental conditions as in Example 1, the same dopant/PANI molar ratio (0.5) and the same solvent, a self-supported film of PANI doped with DBEESSA of formula (III) is prepared.

This dopant is prepared by esterification of sulphosuccinic acid with butoxyethanol in the same way as in Example 1 for DBEEESSA. The sample obtained exhibits an electrical conductivity of 125 S/cm and an elongation at break of 130%.

EXAMPLE 4

Using the same experimental conditions as in Example 1, the same molar ratio and the same solvent, a self-supported film of polyaniline doped with DEHESSA of formula (II) is prepared.

This dopant is prepared from its sodium salt in the sulphonate form, which is available commercially, by passing it through an ion-exchange resin, followed by drying under vacuum.

The sample obtained exhibits at ambient temperature an electrical conductivity of 110 S/cm and an elongation at break of 95%.

The diffractogram of the polyaniline doped by DEHESSA thus obtained has been represented in FIG. 1, in which the intensity I of the diffraction peaks is represented as a function of the inverse of the distance q, q being defined by $q=(2\pi/d)$, d having the dimension of a crystallographic distance and being commonly determined by Bragg's law. A peak of high intensity, corresponding to an interlayer distance of 27.1 Å, can be observed in this graph. This value is characteristic of a supramolecular organization of the lamellar type. This high degree of molecular organization is unequivocally due to the supramolecular interactions resulting from the hydrogen bonds between the carbonyl groups of the dopant and the amine groups of the polymer.

COMPARATIVE EXAMPLE 3

Using the same experimental conditions as in Example 1 and COMPARATIVE EXAMPLE 1, a self-supported film of polyaniline doped with camphorsulphonic acid, known as CSA, is prepared which exhibits an electrical conductivity at ambient temperature of 230 S/cm and an elongation at break of 2%.

Figure 2:
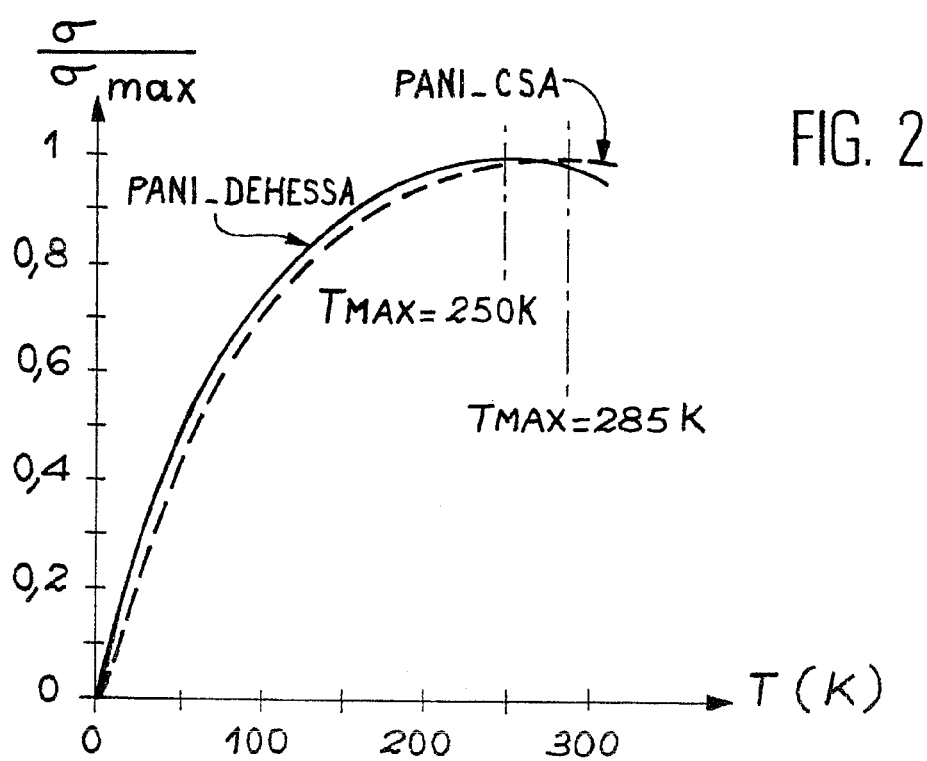
FIG. 2 illustrates the variations in electrical conductivities ($\sigma/\sigma_{max}$) (in S/cm) of a film of polyaniline doped according to the invention, PANI/DEHESSA, and of a film of polyaniline doped according to the prior art, PANI/CSA, as a function of the temperature (in K). The conductivity is expressed in the form of reduced conductivity, that is to say the ratio ($\sigma/\sigma_{max}$) of the measured conductivity $\sigma$ to the maximum conductivity $\sigma_{max}$.

The variations in the reduced conductivity ($\sigma/\sigma_{max}$) as a function of the temperature T (in K) of the conductive film (PANI-DEHESSA) obtained in Example 4 with the dopant DEHESSA in 2,2-dichloroacetic acid and of the conductive film of polyaniline according to the prior art doped with camphorsulphonic acid in m-cresol obtained above, the combination being referred to as (PANI—CSA), have been represented in FIG. 2.

The reduced electrical conductivity ($\sigma/\sigma_{max}$) corresponds to the ratio of the measured conductivity a to the maximum conductivity $\sigma_{max}$. For the two samples in question, it may be pointed out that they both exhibit a metallic behaviour. For the PANI-CSA test, the conductivity maximum lies at a temperature of 285 K, whereas, for the PANI-DEHESSA test, the conductivity maximum lies at a temperature of 250 K. Beyond these temperatures, the electrical conductivity decreases when the temperature continues to increase, which reflects a metallic behaviour.

These examples demonstrate that the use of dopants corresponding to the general formula (I) improves not only the mechanical properties of the polyaniline films but also the metallic behaviour, in so far as the temperature range in which this behaviour is displayed is broader in the case of the PANI doped with DEHESSA than in the case of the PANI doped with CSA.

EXAMPLE 5

Using the same experimental conditions as those of Example 4, a solution intended for the casting of a self-supported film of polyaniline is prepared. 30% by weight with respect to the weight of PANI of an external plasticizer, triphenyl phosphate, are added to this solution. The sample exhibits, at ambient temperature, a conductivity of 102 S/cm and an elongation at break of 100%.

This example shows that the addition of a plasticizer, devoid of doping properties, improves the drawability of the doped polyaniline while protecting its high electrical conductivity.

EXAMPLE 6

9 mg of a solution of PANI doped with DEHESSA prepared in accordance with Example 1 are mixed with 100 mg of a 10% by weight solution of poly(methyl methacrylate), PMMA, in 2,2-dichloroacetic acid additionally containing 30% by weight of TPP plasticizer of formula (VII) with respect to the weight of PMMA. After stirring for a lengthy period of time, a composite material is obtained by casting at 45° C. which exhibits a conductivity of $3\times10^{-1}$ S/cm.

EXAMPLE 7

Using the same experimental conditions as in Example 1, the same molar ratio and the same solvent, a self-supported nondrawn film of PANI doped with DEHESSA of formula (II) (PANI-DEHESSA 1) is prepared.

A film drawn to 77% is also prepared by drawing the sample prepared above at a rate of 1 mm/min at ambient temperature (PANI-DEHESSA 2).

The variations in the electrical conductivity of the two films as a function of the temperature are determined. The results obtained are represented in FIG. 3.

Figure 3:
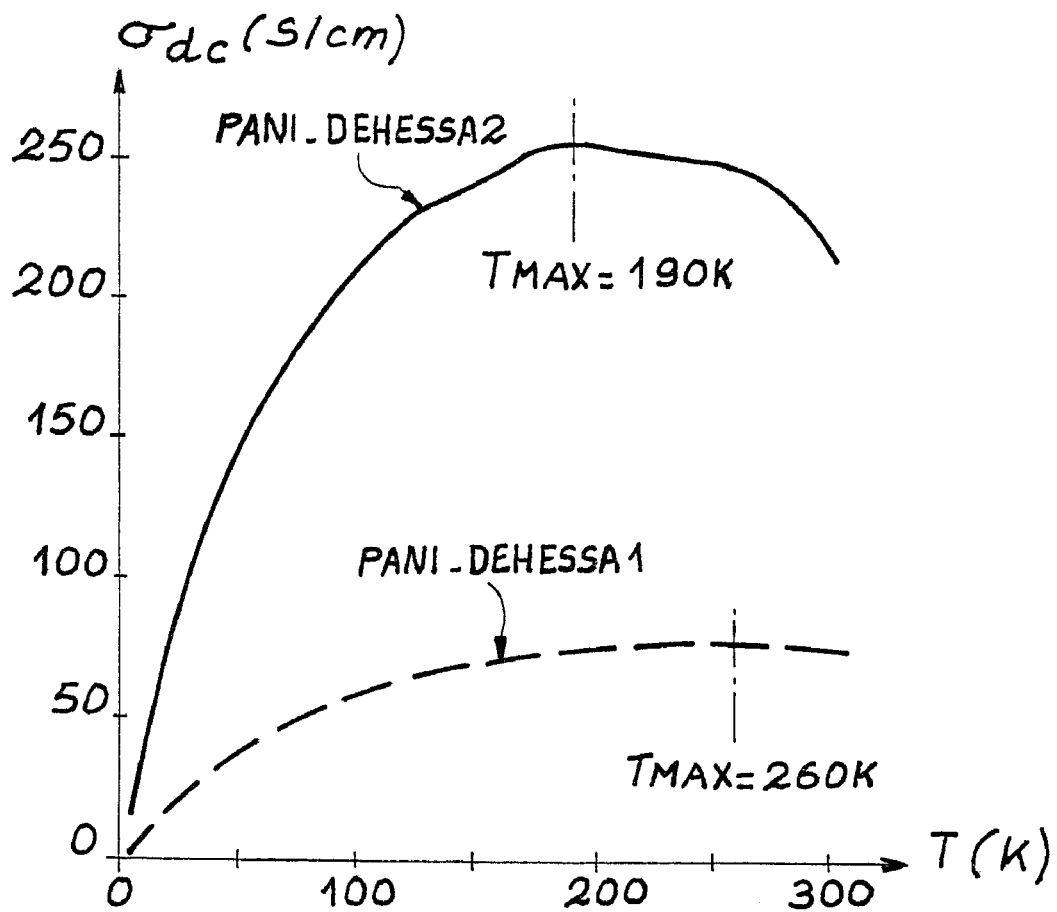
FIG. 3 illustrates the variations in electrical conductivities $\sigma_{dc}$ (in S/cm) as a function of the temperature (in K) of a nondrawn film of polyaniline doped according to the invention, PANI/DEHESSA (PANI-DEHESSA 1), and of the same film drawn (PANI-DEHESSA 2) at a rate of 1 mm/min at ambient temperature to an elongation of 77%.

According to FIG. 3, it is noticed that the sample of nondrawn film PANI-DEHESSA 1 exhibits, at ambient temperature, an electrical conductivity of 75 S/cm. For this same sample, the conductivity maximum lies at a temperature Tab of 260 K.

On the PANI-DEHESSA 2 curve, it is noticed that the sample of film drawn to 77-% exhibits, at ambient temperature, an electrical conductivity of 210 S/cm and a conductivity maximum at 190 K.

This example demonstrates that the use of dopants of general formula (I) makes it possible to draw films of doped polyaniline at ambient temperature, to increase the electrical conductivity at ambient temperature by a factor at least equal to 3, and to extend the region of metallic behaviour down to temperatures at least as low as 190 K.

BIBLIOGRAPHIC REFERENCES

[1]: Synthetic Metals, 48, 1992, pp. 91-97.
[2]: J. Phys.: Condens. Matter, 10, 1998, pp. 8293-8303.
[3]: Polymer, 1993, Volume 34, Number 20, pp. 4235-4240.
[4]: Synthetic Metals, 80, 1996, pp. 191-193.
[5]: FR 2 796 379.

The invention claimed is:

1. A composition for the manufacture of conductive polyaniline films or of conductive polyaniline-based composite material, which comprises:
   a polyaniline present in its emeraldine base form, and
   a dopant corresponding to the general formula:

$$R_2 \diagup O \diagdown \underset{O}{\overset{}{C}} \diagdown R_3 \diagdown \underset{R_1}{\overset{}{CH}} \diagdown R_4 \diagdown \underset{O}{\overset{}{C}} \diagdown O \diagdown R_2 \quad (I)$$

in which:
   $R_1$ represents —$SO_2$(OH),
   the $R_2$ groups, which are identical, represent a saturated or unsaturated hydrocarbonaceous group with a linear or branched chain, comprising in its chain, two oxygen atoms, and
   $R_3$ is a direct bond and $R_4$ is methylene.

2. The composition as claimed in claim 1, wherein the dopant corresponds to the formula (I) in which $R_2$ is a linear or branched alkyl group further comprising from 5 to 12 carbon atoms.

3. The composition as claimed in claim 1, wherein the dopant corresponds to the formula:

(IV)

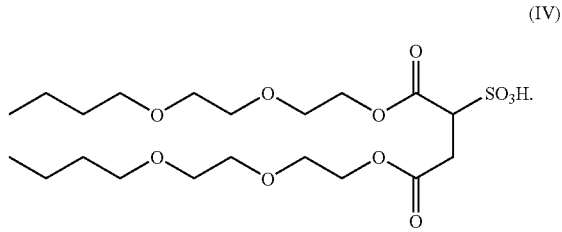

4. The composition as claimed in claim 1, wherein the polyaniline comprises a number of repeat units of greater than 10, the repeat unit corresponding to the following formula (V):

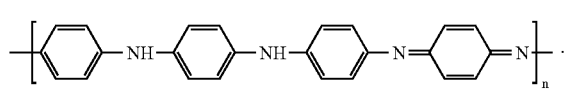

(V)

5. The composition as claimed in claim 1, wherein the dopant is present with respect to the polyaniline in a molar ratio of 0.4 to 0.6.

6. The composition as claimed in claim 1, which additionally comprises a plasticizer.

7. The composition as claimed in claim 6, wherein the plasticizer is chosen from diesters of phthalic acid and esters of phosphoric acid.

8. The composition as claimed in claim 7, wherein the plasticizer is chosen from the compounds of the following formulae:

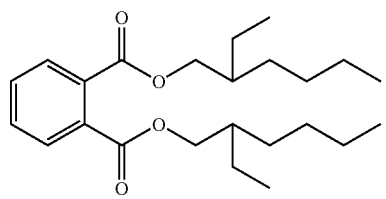

(VI)

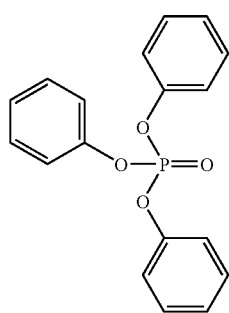

(VII)

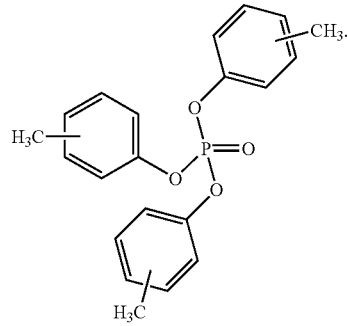

(VIII)

9. The composition as claimed in claim 6, wherein said plasticizer is present with respect to the polyaniline at a content of 10 to 40% by weight.

10. The composition as claimed in claim 1, which additionally comprises a solvent.

11. The composition as claimed in claim 1, wherein the solvent corresponds to the following formula (IX):

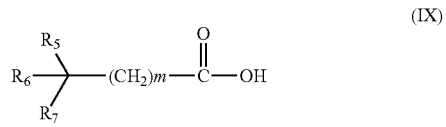

(IX)

in which $R_5$, $R_6$ and $R_7$ each represent the same atom or at least two different atoms chosen from the group of atoms consisting of H, F, Cl, Br and CN, and m is equal to 0 or is an integer of less than 12.

12. The composition as claimed in claim 11, wherein the solvent is chosen from 2,2-dichloroacetic acid, 2,2-difluoroacetic acid, perfluoroacetic acid, chlorodifluoroacetic acid, bromoacetic acid, chloroacetic acid and a mixture of these.

13. The composition as claimed in claim 12, wherein the solvent is 2,2-dichloroacetic acid.

14. The composition as claimed in claim 10, wherein the polyaniline is present at a content of 0.1 to 10% by weight.

15. A process for the manufacture of a conductive polyaniline film, which comprises successively the following stages:

pouring, over a support, the composition as claimed in claim 10, and forming the film by evaporation of the solvent.

16. A process for the manufacture of a conductive polyaniline-based composite material, which comprises successively the following stages:

mixing a first solution, formed from the polyaniline composition in a solvent as claimed in claim 10, with a second solution of an insulating polymer in a solvent, and forming, from the mixture obtained, a composite material by evaporation of the solvents.

17. The process for the manufacture of a conductive composite material as claimed in claim 16, wherein the solvent of the first solution and the solvent of the second solution are identical.

18. The process for the manufacture of a conductive composite material as claimed in claim 16, wherein the insulating polymer is selected from the group consisting of vinyl polymers, cellulose polymers, acrylic polymers, polyester polymers, polyamide polymers, and mixtures thereof.

19. The composition as claimed in claim 10, wherein the solvent corresponds to the following formula (IX)

$$\begin{array}{c} R_5 \\ R_6 \end{array} \!\!-\!\!(CH_2)_m\!-\!\overset{O}{\underset{\|}{C}}\!-\!OH \quad (IX)$$

in which $R_5$, $R_6$ and $R_7$ each represent the same atom or at least two different atoms chosen from the group of atoms consisting of H, F, Cl, Br and CN, and m is equal to 0 or is an integer of less than 4.

20. A process for the manufacture of a conductive polyaniline film, which comprises successively the following stages:
preparing the composition as claimed in claim 1, and
forming, from said composition, the film by heat treatment.

21. A process for the manufacture of a conductive polyaniline-based composite material, which comprises successively the following stages:
mixing the composition as claimed in claim 1 with an insulating polymer;
forming, from the mixture obtained, a composite material by heat treatment.

22. The process for the manufacture of a conductive composite material as claimed in claim 21, wherein the insulating polymer is selected from the group consisting of vinyl polymers, cellulose polymers, acrylic polymers, polyester polymers, polyamide polymers, and mixtures thereof.

23. A conductive polyaniline doped by a compound corresponding to the formula:

$$R_2\!-\!\overset{O}{\underset{\|}{C}}\!-\!\overset{R_3}{\underset{}{}}\!-\!\overset{}{\underset{R_1}{CH}}\!-\!\overset{R_4}{\underset{}{}}\!-\!\overset{O}{\underset{\|}{C}}\!-\!O\!-\!R_2 \quad (I)$$

in which:
$R_1$ represents $-SO_2(OH)$,
the $R_2$ groups, which are identical, represent a saturated or unsaturated hydrocarbonaceous group with a linear or branched chain, comprising, in its chain, two oxygen atoms, and
$R_3$ is a direct bond and $R_4$ is methylene.

24. The polyaniline as claimed in claim 23, doped by an acid chosen from the acids corresponding to the following formulae:

(IV)

25. The polyaniline as claimed in claim 23, which additionally comprises a plasticizer.

26. The polyaniline as claimed in claim 25, wherein the plasticizer is triphenyl phosphate.

27. A conductive composite material, which comprises an insulating polymer matrix within which is dispersed a conductive polyaniline doped by a dopant of the general formula:

$$R_2\!-\!\overset{O}{\underset{\|}{C}}\!-\!\overset{R_3}{\underset{}{}}\!-\!\overset{}{\underset{R_1}{CH}}\!-\!\overset{R_4}{\underset{}{}}\!-\!\overset{O}{\underset{\|}{C}}\!-\!O\!-\!R_2 \quad (I)$$

in which:
$R_1$ represents $-SO_2(OH)$
the $R_2$ groups, which are identical, represent a saturated or unsaturated hydrocarbonaceous group with a linear or branched chain, comprising, in its chain, two oxygen atoms, and
$R_3$ is a direct bond and $R_4$ is methylene.

28. The conductive composite material as claimed in claim 27, the polyaniline of which is doped by an acid chosen from the acids corresponding to the following formulae:

(IV)

29. The conductive composite material as claimed in claim 27, which additionally comprises a plasticizer.

30. The conductive composite material as claimed in claim 27, wherein the insulating polymer is poly(methyl methacrylate).

31. The conductive composite material as claimed in claim 27, wherein the polyaniline is present in the conductive material composite at a content of 0.01 to 40% by weight.

* * * * *